US010997474B2

(12) United States Patent
Munir et al.

(10) Patent No.: US 10,997,474 B2
(45) Date of Patent: May 4, 2021

(54) APPARATUS AND METHOD FOR PERSON DETECTION, TRACKING, AND IDENTIFICATION UTILIZING WIRELESS SIGNALS AND IMAGES

(71) Applicant: Robert Bosch GmbH, Stuttgart (DE)

(72) Inventors: Sirajum Munir, Pittsburgh, PA (US); Vivek Jain, Sunnyvale, CA (US); Samarjit Das, Sewickley, PA (US)

(73) Assignee: ROBERT BOSCH GMBH, Stuttgart (DE)

( * ) Notice: Subject to any disclaimer, the term of this patent is extended or adjusted under 35 U.S.C. 154(b) by 91 days.

(21) Appl. No.: 16/525,069

(22) Filed: Jul. 29, 2019

(65) Prior Publication Data

US 2021/0034927 A1   Feb. 4, 2021

(51) Int. Cl.
*G06K 9/62* (2006.01)
*H04W 64/00* (2009.01)
*G01S 13/86* (2006.01)

(52) U.S. Cl.
CPC .......... *G06K 9/6288* (2013.01); *G01S 13/867* (2013.01); *H04W 64/003* (2013.01); *H04W 64/006* (2013.01)

(58) Field of Classification Search
CPC . G06K 9/6288; G01S 13/867; H04W 64/006; H04W 64/003
See application file for complete search history.

(56) References Cited

U.S. PATENT DOCUMENTS

| 10,217,120 | B1 | 2/2019 | Shin et al. |
|---|---|---|---|
| 10,305,766 | B1* | 5/2019 | Zhang ................. G06N 3/0481 |
| 2010/0311347 | A1 | 12/2010 | Le Thierry D'Ennequin et al. |
| 2015/0235237 | A1 | 8/2015 | Shaw et al. |
| 2017/0046891 | A1* | 2/2017 | Trivelpiece ........ G07C 9/00174 |
| 2017/0262995 | A1 | 9/2017 | Li et al. |
| 2017/0365163 | A1 | 12/2017 | MacKenzie et al. |
| 2020/0175864 | A1* | 6/2020 | Solmaz ........... H04W 12/00524 |

FOREIGN PATENT DOCUMENTS

| CN | 106899827 A | 6/2017 |
|---|---|---|
| WO | 2012024516 A2 | 2/2012 |

OTHER PUBLICATIONS

Redmon et al., "You Only Look Once: Unified, Real-Time Object Detection", May 9, 2016, University of Washington, 10 pages.
(Continued)

*Primary Examiner* — Christopher M Brandt
(74) *Attorney, Agent, or Firm* — Brooks Kushman P.C.

(57) ABSTRACT

An apparatus comprising a wireless transceiver configured to communicate packet data with a mobile device associated with one or more persons in a vicinity of the wireless transceiver, and a controller in communication with the wireless transceiver and a camera, the controller configured to receive a plurality of packet data from one or more person, wherein the packet data includes at least amplitude information associated with the wireless channel communicating with the wireless transceiver and receive images from the camera containing trajectory of motion of individuals, performs detection, tracking, and pseudo-identification of individuals by fusing motion trajectories from wireless signals and camera images.

20 Claims, 6 Drawing Sheets

(56) References Cited

OTHER PUBLICATIONS

Ren et al., "Faster R-CNN: Towards Real-Time Object Detection with Region Proposal Networks", Jan. 6, 2016, 14 pages.
Liu et al., "SSD: Single Shot MultiBox Detector", Dec. 29, 2016, University of Michigan, Ann Arbor, 17 pages.
Comaniciu et al., "Real-Time Tracking of Non-Rigid Objects using Mean Shift", New Jersey, 8 pages.
Hochreiter et al., "Long Short-Term Memory", Germany, 32 pages.
Horn et al., "Determining Optical Flow", Artificial Intelligence, Massachusetts, 19 pages.
Kotaru et al., "SpotFi: Decimeter Level Localization Using WiFi", California, 14 pages.
Vaswani et al., "Attention Is All You Need", Dec. 6, 2017, 31st Conference on Neural Information Processing Systems, California, 15 pages.
Thiago Teixeira et al, "Tasking networked CCTV cameras and mobile phones to identify and localize multiple people", Proceedings of TEH 12TH ACM International Conference on Ubiquitous Computing, 2010, pp. 213-222.
Qiang Zhai et al, "VM-tracking Visual-motion sensing integration for real-time human tracking", IEEE Conference on Computer Communications (INFOCOM), 2015, pp. 711-719.

* cited by examiner

APPARATUS AND METHOD FOR PERSON DETECTION, TRACKING, AND IDENTIFICATION UTILIZING WIRELESS SIGNALS AND IMAGES

TECHNICAL FIELD

The present disclosure relates to wireless and camera based monitoring systems.

BACKGROUND

Retail stores, airports, convention centers, and smart areas/neighborhoods may monitor people in the vicinity. Detection, tracking, and pseudo identification of people may have various use cases in different applications. In many applications, cameras may be used to track people. Cameras in retail stores, for instance, may have cameras mounted in the ceiling looking downward and lack the ability to accurately identify people using facial recognition algorithms. Furthermore, facial recognition algorithms may not perform well in places where thousands of people may be located (e.g., an airport or a large retail store).

SUMMARY

According to one embodiment, an apparatus includes a wireless transceiver configured to communicate packet data with a mobile device associated with one or more persons in a vicinity of the wireless transceiver. The apparatus further includes a camera configured to capture image data of one or more persons in the vicinity. The apparatus further includes a controller in communication with the wireless transceiver and the camera, the controller configured to receive a plurality of packet data from the mobile device, wherein the packet data includes at least amplitude information associated with a wireless channel communicating with the wireless transceiver, determine a camera motion representing motion of the one or more persons utilizing the image data and a packet motion representing motion of the one or more persons utilizing the packet data, identify each of the one or more persons in response to the camera motion and the packet motion, and output information associated with each of the one or more persons in response to the identification of the one or more persons.

According to another embodiment, a system includes a wireless transceiver configured to communicate packet data with a mobile device associated with one or more persons in a vicinity of the wireless transceiver. The system also includes a camera configured to identify the one or more persons and identify an estimated camera motion utilizing at least image data. The system also includes a controller in communication with the wireless transceiver and the camera. The controller is configured to receive a plurality of packet data from the mobile device, wherein the packet data includes at least amplitude information associated with the wireless channel communicating with the wireless transceiver, estimate a packet motion of each of the one or more persons in response to the plurality of packet data, and identify each of the one or more persons in response to the estimated camera motion and estimated packet motion.

According to yet another embodiment, a method of identifying a person utilizing a camera and a wireless transceiver, comprising receiving packet data from a mobile device associated with one or more persons in a vicinity of the wireless transceiver, obtaining image data associated with the camera associated with the wireless transceiver, determining an estimated camera motion of the person utilizing the image data, determining an estimated motion of the person utilizing the packet data from the mobile device, comparing the estimated camera motion to the estimated motion; and identifying the one or more persons in response to the comparison.

DETAILED DESCRIPTION

Figure 1:
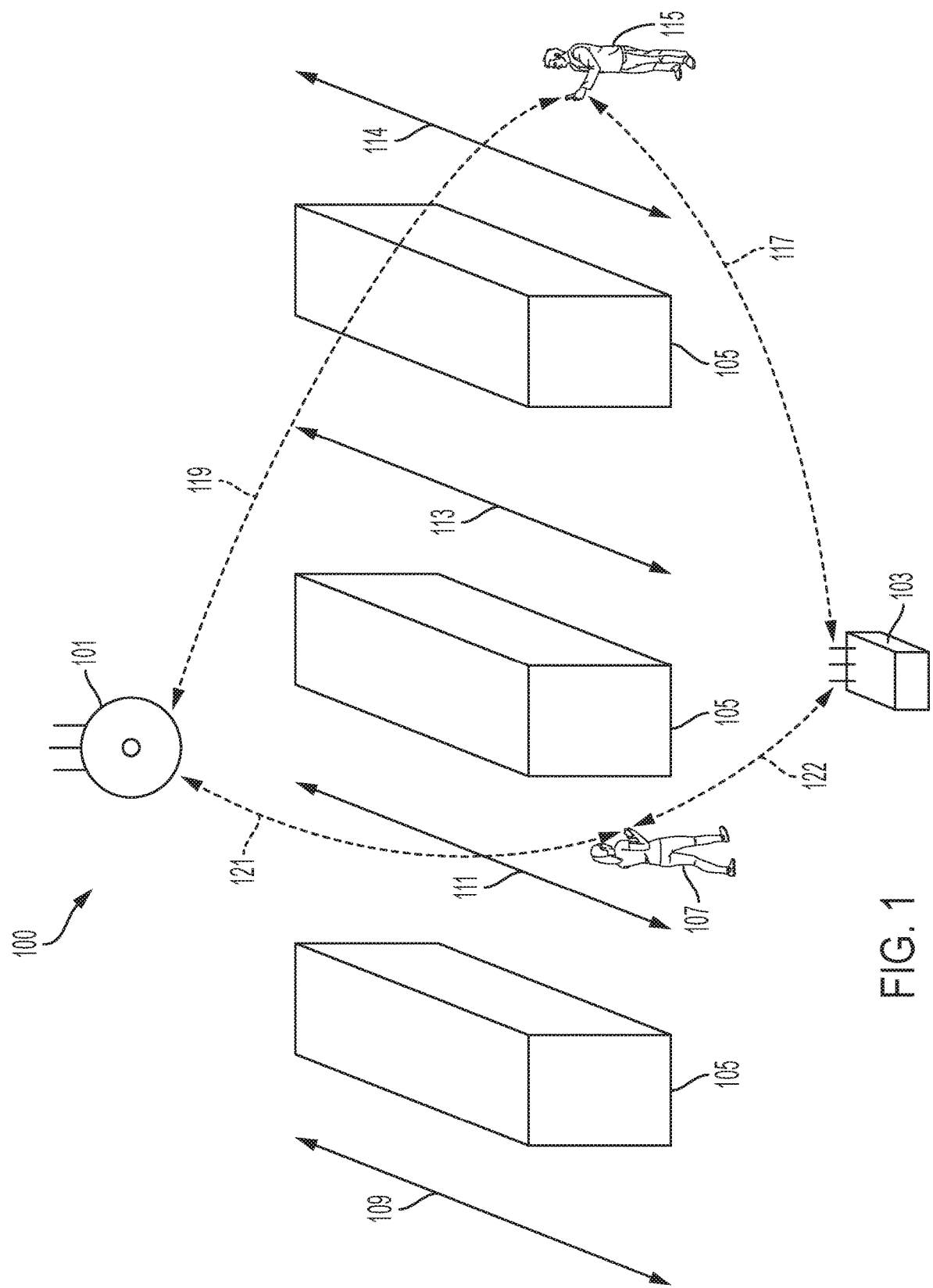
FIG. 1 is an overview system diagram of a wireless system according to an embodiment of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Detecting, tracking, and identifying people may be important for a wide range of applications including retail stores, airports, convention centers, and smart cities. In many applications, cameras are used to track people. However, in a lot of settings, e.g., in retail stores, cameras are mounted in a ceiling looking downwards and lack the ability to accurately identify people by using facial recognition algorithms. Also, the facial recognition algorithms may not scale across hundreds of thousands of people, e.g., in an airport or in a large retail store. At the same time facial recognition may also be regulated in some places due to privacy concerns. However, for many analytics applications fine grained identification of people is not required as focus is on data per person rather than specific person. However, to obtain such data it is imperative to differentiate between different persons and also re-identify when same person is in vicinity. In one embodiment, camera data and also data obtained from wireless devices carried by the person (such as unique specific device details—MAC address, list of AP device is looking for, and so on) to capture that person's movement or journey in a given setting (retail, office, malls, hospital, etc.).

In order to pseudo identify and track people, wireless technologies may be used to track the wireless devices (such as phones, wearables) carried by the user. For example, Bluetooth and Wi-Fi packets are sniffed to identify and locate nearby people. However, current solutions mostly use RSSI feature of the wireless signal and obtain coarse grained location, e.g., if a given wireless device (and the person) is within a certain radius (e.g. 50 meters). Also, in order to locate a wireless device, there are techniques that require deployment of multiple infrastructure anchors to receive the packet from the device simultaneously and then perform trilateration using RSSI values. The accuracy of these solutions suffers due to fluctuations and lack of information provided by RSSI. Compared to RSSI, CSI (Channel State Information) provides much richer information about how a signal propagates from the transmitter to a receiver and captures the combined effect of signal scattering, fading, and power decay with distance. Our proposed solution uses CSI and uses a single system unit (with multiple antennas) and hence reduces effort of deploying multiple units. However, multiple system units can be deployed for better performance.

FIG. 1 is an overview system diagram of a wireless system 100 according to an embodiment of the disclosure. The wireless system 100 may include a wireless unit 101 that utilized to generate and communicate CSI data. The wireless unit 101 may communicate with mobile devices (e.g. cell phone, wearable device, tablet) of an employee 115 or a customer 107. For example, a mobile device of an employee 115 may send wireless signal 119 to the wireless unit 101. Upon reception of a wireless packet, system unit 101 obtains the associated CSI values of packet reception. Also, the wireless packet may contain identifiable information about the device ID, e.g., MAC address that is used to identify employee 115. Thus, the system 100 and wireless unit 101 may not utilize the data exchanged from the device of the employee 115 to determine various hot spots.

While Wi-Fi may be utilized as a wireless communication technology, any other type of wireless technology may be utilized. For example, Bluetooth may be utilized if the system can obtain CSI from a wireless chipset. The system unit may be able to contain a Wi-Fi chipset that is attached to up to three antennas, as shown by wireless unit 101 and wireless unit 103. A system unit may include a receiving station that contains a Wi-Fi chipset that includes up to three antennas in one embodiment. The system unit can be mounted at an arbitrary height or at a ceiling. A chipset that utilizes CSI information may be utilized in another embodiment. The wireless unit 101 may include a camera to monitor various people walking around a POI. In another example, the wireless unit 103 may not include a camera and simply communicate with the mobile devices.

The system 100 may cover various aisles, such as 109, 111, 113, 114. The aisles may be defined as a walking path between shelving 105 or walls of a store front. The data collected between the various aisles 109, 111, 113, 114 may be utilized to generate a heat map and focus on traffic of a store. The system may analyze the data from all aisles and utilize that data to identify traffic of other areas of the store. For example, data collected from the mobile device of various customers 107 may identify areas that the store receive high traffic. That data can be used to place certain products. By utilizing the data, a store manager can determine where the high-traffic real estate is located versus low-traffic real estate. In addition, by fusing pseudo-identification information using WiFi with camera based analytics (e.g., gender, age range, ethnicity), the system can build profiles of individual customers and customer specific analytics for individual aisles. Also, by capturing the entire journey of individual customers, the system can provide store-wide customer specific analytics.

The CSI data may be communicated in packets found in wireless signals. In one example, a wireless signal 121 may be generated by a customer 107 and their associated mobile device. The system 100 may utilize the various information found in the wireless signal 121 to determine whether the customer 107 is an employee or other characteristic, e.g., Angle of Arrival (AoA) of the signal. The customer 107 may also communicate with wireless unit 103 via signal 122. Furthermore, the packet data found in the wireless signal 121 may communicate with both wireless unit 101 or unit 103. The packet data in the wireless signal 121, 119, and 117 may be utilized to provide information related to motion trajectory and traffic data related to mobile devices of employees/customers.

Figure 2:
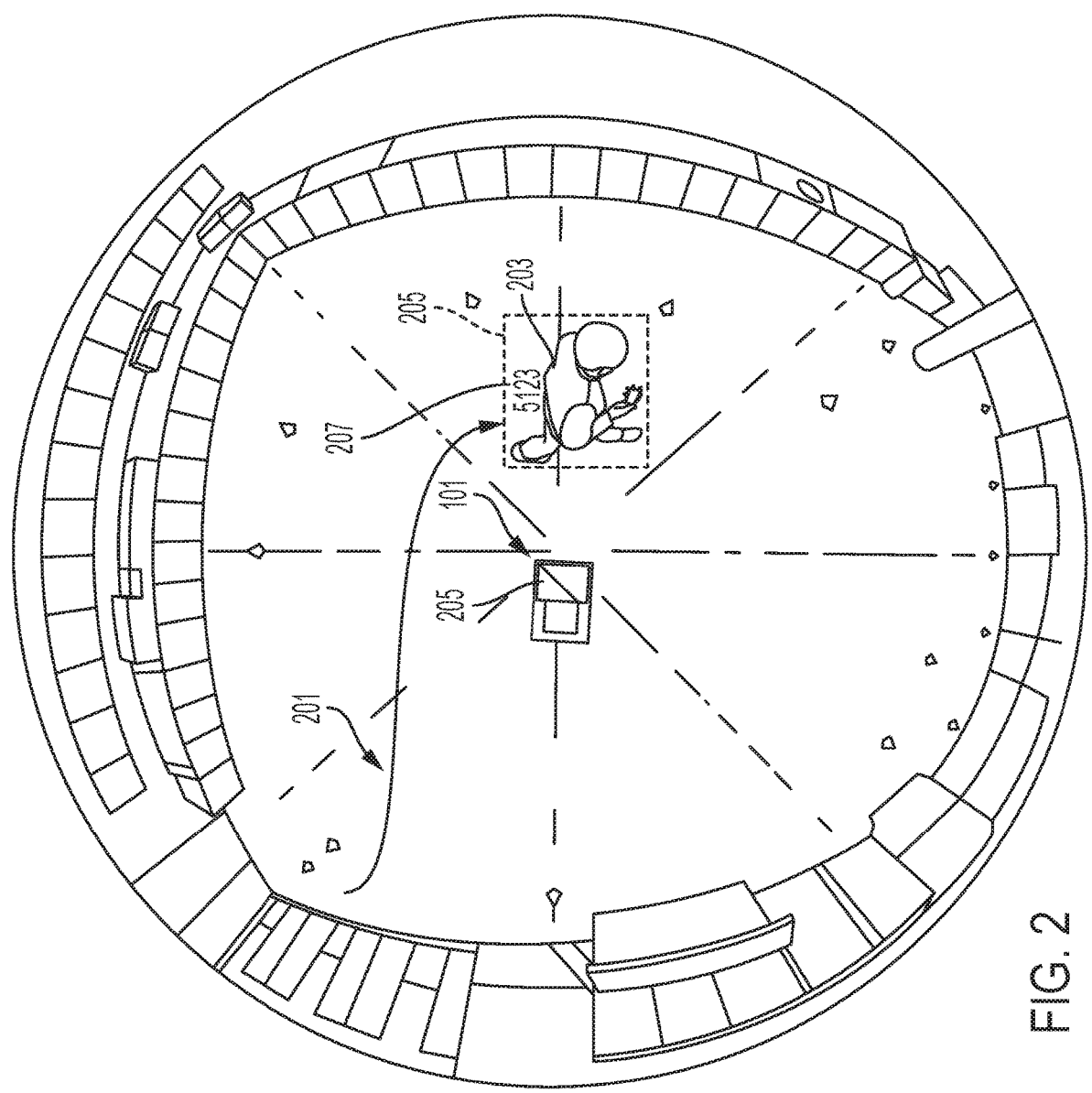
FIG. 2 is an exemplary image of the image data collected in a camera according to an embodiment in this disclosure.

FIG. 2 is an exemplary image of the image data collected in a camera according to an embodiment in this disclosure. The camera in FIG. 2 may be mounted in a wireless unit 101 in the ceiling, as shown by the image data. In other embodiments, the wireless unit 101 may be mounted anywhere else, such as a shelf or a wall. The motion trajectory 201 of a person 203 is shown and can be determined according to the various embodiments disclosed below. The image data that is captured by the camera may be utilized to collect information regarding a person (e.g. customer or employee, gender, age range, ethnicity) moving around certain space. As described further below, the image data may also be overlaid with a heatmap or other information. The camera may add a boundary box 205 around a person. The camera may detect humans using object detection techniques, such as YOLO, SSD, Faster RCNN, etc. The bounding box may identify a boundary around a person or object that may be displayed on a graphical image to identify the person or object. The bounding boxes may be tracked utilizing Optical Flow, Mean-Shift Tracking, Kalman filter, particle filter, or other type of mechanism. The tracking may be estimated by analyzing the position of a person over any given length of time. Furthermore, an identification number 207 may be assigned to a person identified utilizing the various techniques explained further below.

Figure 3:
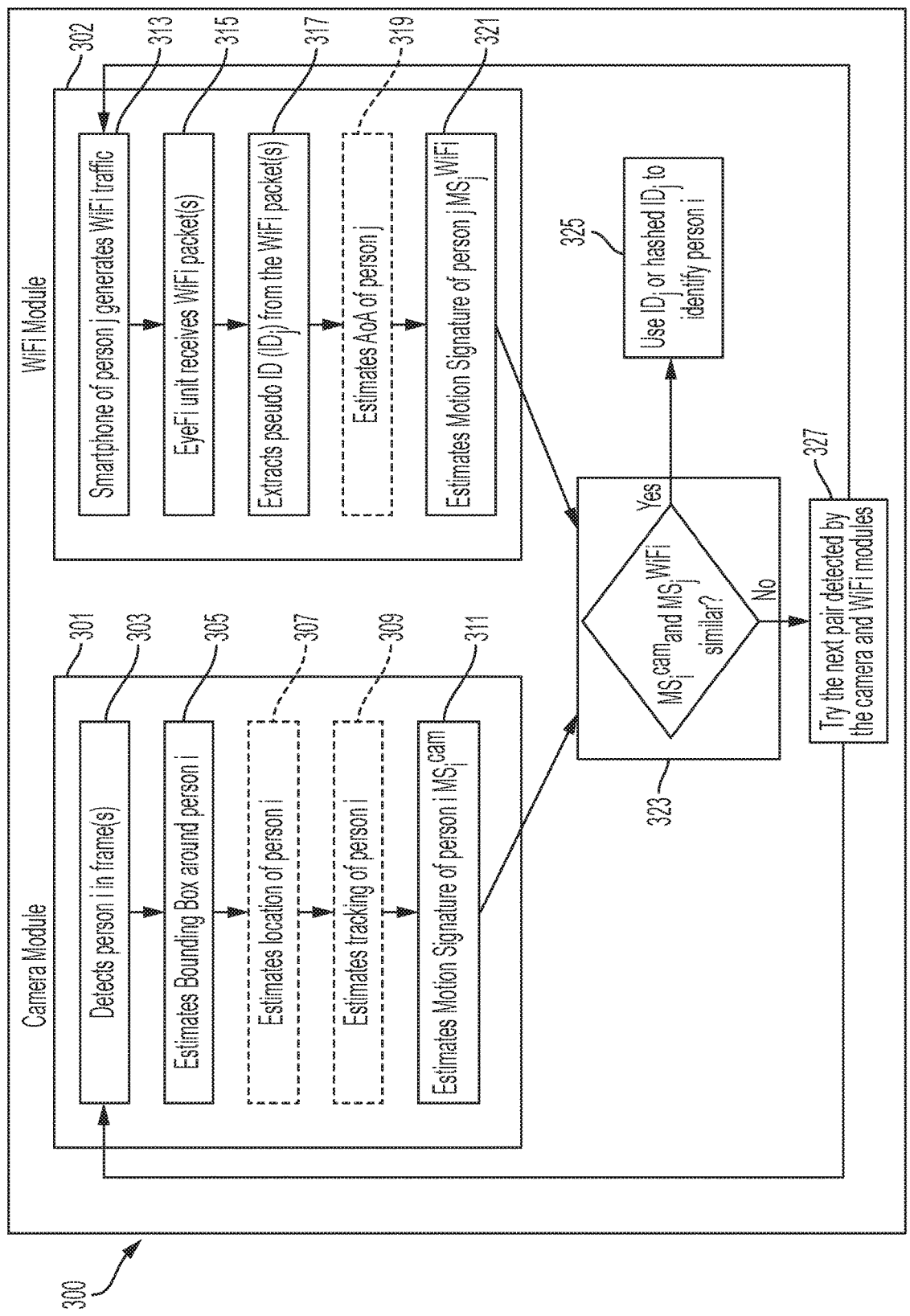
FIG. 3 is an exemplary flow chart of an algorithm according to an embodiment of this disclosure.

FIG. 3 is an exemplary flow chart of an algorithm according to an embodiment of this disclosure. The system 100 shows an exemplary embodiment of an algorithm utilized to identify a camera image with motion tracking of a wireless transceiver (e.g. Wi-Fi transceiver, Bluetooth transceiver, RFID transceiver, etc.). The system may utilize a camera 301 and a wireless transceiver 302 in one embodiment. At a high-level, the camera 301 may utilize various data (e.g., image data) and the wireless transceiver 302 may utilize its own data (e.g., wireless packet data) to estimate motion of various persons or objects that the camera 301 and wireless transceiver 302 identify, and then determine if the person can be matched utilizing both sources of data.

Figure 6:
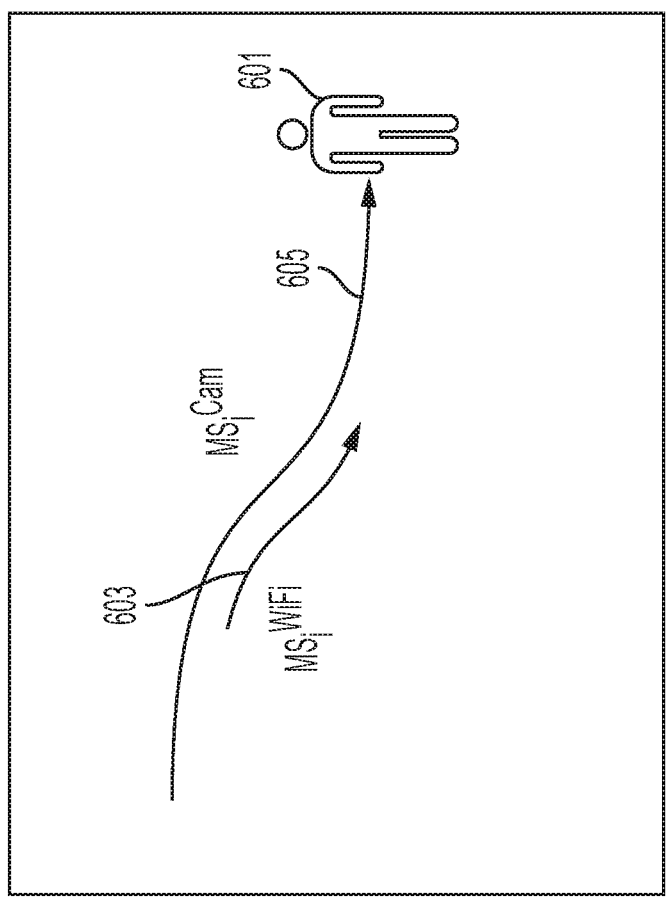
FIG. 6 is an exemplary visualization of a motion signature using camera and a motion signature using Wi-Fi.

At step 303, the camera 301 may detect a person i in one or more frames. The person may be detected utilizing objection identification tracking of various frames that utilize algorithms to identify various objects. The camera 301 may detect humans using object detection techniques, such as YOLO, SSD, Faster RCNN, etc. Upon detecting the person, the camera 301 may then estimate a bounding box around the person i at step 305. The bounding box may identify a boundary around a person or object that may be displayed on a graphical image to identify the person or object. At step 307, the camera may estimate a location of person i by identifying a position of the body of person i. For example, the camera 301 may estimate a position by looking at feet or another object associated with the person. In another example, bounding boxes may be tracked utilizing Optical Flow, Mean-Shift Tracking, Kalman filter, particle filter, or other type of mechanism. At step 309, the system 300 may estimate track of the person i. The tracking may be estimated by analyzing the position of the person i over any given length of time. For example, the system may track a person in different intervals, such as 1 second, 5 seconds, 10 second, etc. In one example, it may be optional for the camera unit 301 to estimate the location of the person and track the person. At step 311, the camera 301 estimates a motion signature of person i as $MS_i^{cam}$. An example motion signature $MS_i^{cam}$ is shown in FIG. 6. The motion signature may be a trajectory over a specific time period (e.g., $TW_1$). For example, the time period may be 5 seconds or a longer or short amount of time. The motion signature associated with the camera $MS_i^{cam}$ may be associated with a person and be utilized in connection with the estimates established by the wireless transceiver 302 to identify a person i.

In one embodiment, the wireless transceiver 302 may work simultaneously with the camera 301 to identify the person j. The wireless transceiver receives packets generated by the smartphone or other mobile device of person j at step 313. Thus, the mobile device may generate wireless traffic (e.g. Wi-Fi traffic) that is received at a central system unit. At step 315, a wireless transceiver (e.g. EyeFI unit) may receive the wireless packets (e.g. Wi-Fi packets). CSI values may be extracted from the received packets. When a wireless data packet is received, the corresponding MAC address may be utilized to identify the person. The MAC address may then be assigned to an associated person. Thus, the wireless transceiver 302 may extract pseudo identification information as $ID_j$ at step 317.

At step 319, the system may measure Angle of Arrival (AoA) of the packet utilizing an algorithm (e.g., SpotFi algorithm, or a neural network based AoA estimation algorithm) by leveraging CSI values from multiple antennas. Using the AoA and/or raw CSI values, the system may estimate motion trajectory of person j. The motion signature of the wireless signature may be within a predetermined time window (e.g $TW_2$) using wireless signal (e.g. Wi-Fi). If the wireless transceiver and the camera are time-synchronized, $TW_2$ could be smaller than $TW_1$ as a mobile device may not generate traffic during the entire period while the person was visible through the camera. At step 321, the wireless transceiver 302 may then estimate motion signature $MS_j^{Wi-Fi}$ of person j. An example motion signature $MS_j^{Wi-Fi}$ is shown in FIG. 6.

The system 300 may then compare $MS_i^{cam}$ with $MS_j^{Wi-Fi}$ to determine if they are similar. If they are similar, EyeFi uses $ID_j$ to identify person i. At step 323, the system may determine if the estimated motion signatures from the camera 301 and wireless transceiver 302 are similar. The camera data and wireless data may be fused in order to determine the identify of a person. Algorithms may be used in order to perform multimodal sensor fusion. A threshold may be utilized in the determination between the comparison of the two motion signatures of whether person i and person j are the same person. If a deviation between the two comparisons determine that they are similar, the system 300 may identify the person as $ID_j$ or hashed $ID_j$. If the comparison between the motion signatures show a deviation that is further away than the threshold, then the system may try a next pair of motion signatures ($MS_i^{cam}$ with $MS_j^{Wi-Fi}$) at step 327. Thus, the system may determine that there is not match between the two estimated motion signatures and restart the process of identifying another subset of camera data and wireless data to identify a person. Otherwise, it uses the next pair of persons detected by the camera and wireless transceivers to check if they are similar.

Figure 4:
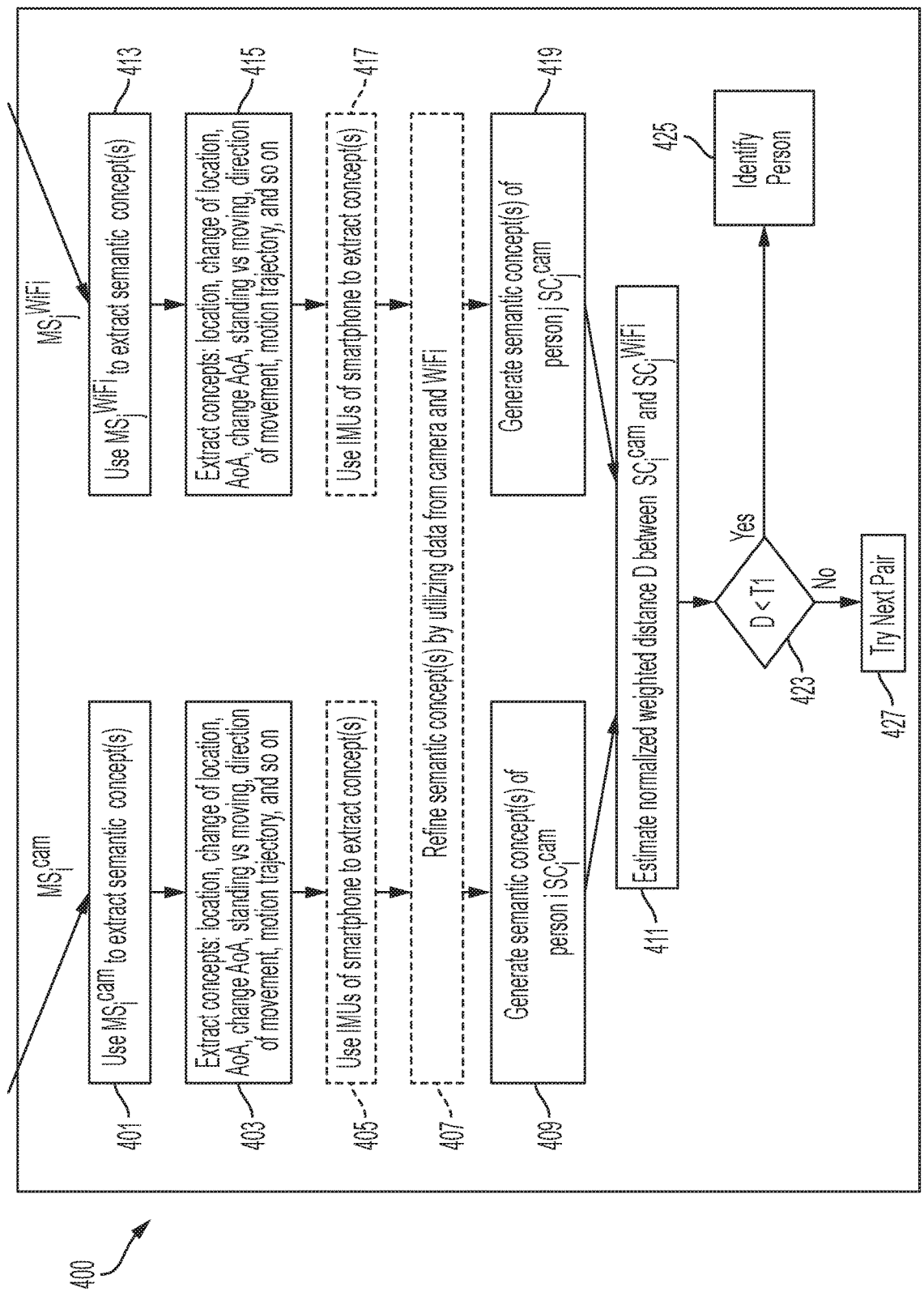
FIG. 4 is an exemplary flow chart of an embodiment comparing a motion signature of the camera and a motion signature from a wireless transceiver.

FIG. 4 is an exemplary flow chart of a system 400 comparing a motion signature of the camera and a motion signature from a wireless transceiver. FIG. 4 is an exemplary flow chart of a secondary embodiment comparing a motion signature of the camera and a motion signature from a wireless transceiver (component 323 of FIG. 3). In this embodiment, in steps 401 and 413 of FIG. 4, data from each modality is mapped to a "semantic concept", which is sensor invariant. For example, in steps 403 and 415, the following "concepts" are extracted for each person: (a) location, (b) change of location, (c) Angle of Arrival (AoA), (d) change of AoA, (e) standing vs moving, (f) direction of movement, (g) orientation of the person, (i) footsteps/gait, (j) phone in the hand or in the pocket, (i) scale of nearby obstructions, and (k) motion trajectory from the vision and WiFi, independently of other sensing modality using neural network based approach or other approaches. It may require a cascade of neural networks to refine these concepts. In another embodiment, instead of estimating the semantic concepts from each modality (e.g. wireless transceiver, camera), IMUs (Inertial Measurement Unit) may be used as a middleground to estimate some concepts as in steps 405 and 417. Because, it may be difficult to estimate gait features either from a wireless transceiver or from a camera. However, if a person installs an app and carries a mobile phone that generates IMUs data using an accelerometer or gyroscope of the mobile phone, then it may be relatively easy to translate CSI data to IMU data, and image data to IMU data. The translated IMU data from each modality may offer a middleground to estimate similarity between the same concept from the two modalities. IMU data may also be utilized for the training phase. After the training is complete and the translation functions are learned from each modality for each concept, the IMU data and app installation may not be required later for product use.

At step 405, inertial movement unit (IMU) data from smartphones may be used to extract the concepts. Similar semantic concepts are extracted for $MS_j^{Wi-Fi}$ with Wi-Fi data. The semantic concepts can be refined and updated by fusing camera and Wi-Fi data at step 407. It may require a single neural network for each modality, or a cascade of neural networks to collectively refine the semantic concepts. At the end $SC_i^{cam}$ and $SC_j^{Wi-Fi}$ are generated to represent semantic concept of person i using camera and semantic concept of person j with Wi-Fi, respectively. Then, the system estimates normalized weighted distance D to determine whether $SC_i^{cam}$ is similar to $SC_j^{Wi-Fi}$. It can also use cosine similarity, or Euclidean distance or cluster analysis, or other similarity measures, or a combination of these for this purpose. If D is less than a threshold T1, then the system returns a 'Yes' meaning $SC_i^{cam}$ is similar to $SC_j^{Wi-Fi}$. Otherwise, it returns a 'No'.

In one embodiment, data from each modality is mapped to a "semantic concept", which is sensor invariant. For example, the following "concepts" are extracted for each person: (a) location, (b) change of location, (c) Angle of Arrival (AoA), (d) change of AoA, (e) standing vs moving, (f) direction of movement, (g) orientation of the person, (i) footsteps/gait, (j) phone in the hand or in the pocket, (i) scale of nearby obstructions, and (k) motion trajectory from the Wi-Fi and vision, independently or by fusing both sensing modalities. Once we have these semantic concepts from each sensing modality for each person, the system unit performs an estimation of similarity between the concepts from each modality for each pair of persons. As an example, let $SC_i^{cam}$ be the semantic concept of person i using camera and $SC_j^{Wi-Fi}$ be the semantic concept of person j using Wi-Fi and $MAC_j$ is associated MAC address with the received packet from person j. In order to determine whether $SC_i^{cam}$ is similar to $SC_j^{Wi-Fi}$, the system uses cosine similarity, or normalized weighted distance, or Euclidean distance or cluster analysis, or other similarity measures, or a combination of these. Once it is found that these two semantic concepts are similar, MACj is used to identify person i and either the actual MAC address ($MAC_j$) or a hashed value of the MAC address is tagged against the bounding box of person i for future tracking, which provides a consistent identification marker.

Figure 5:
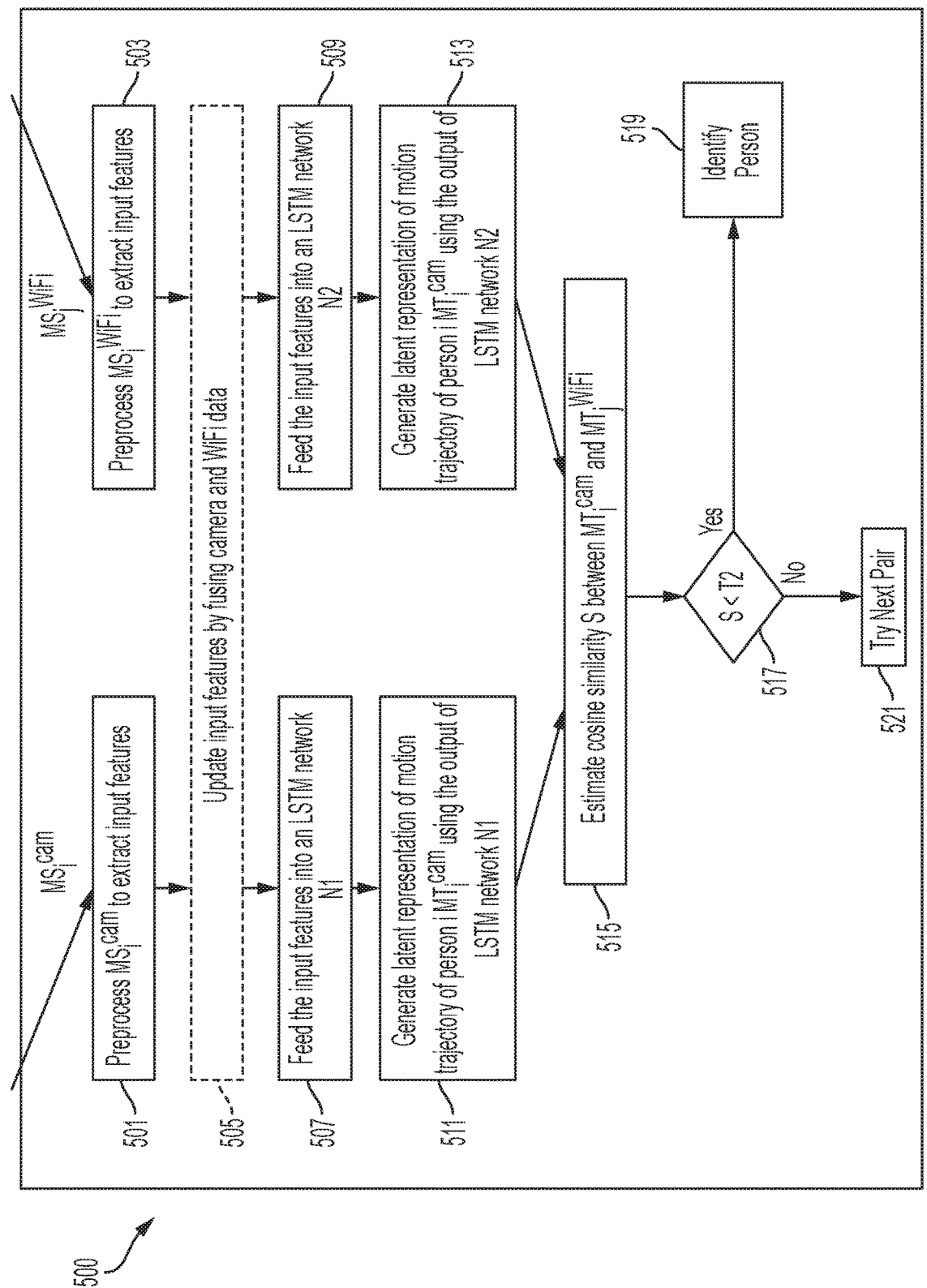
FIG. 5 is an exemplary flow chart of a secondary embodiment comparing a motion signature of the camera and a motion signature from a wireless transceiver.

FIG. 5 is an exemplary flow chart 500 of a secondary embodiment comparing a motion signature of the camera and a motion signature from a wireless transceiver (as part of component 323 of FIG. 3). A LSTM (Long Short Term Memory) network may be used to capture motion signature of each person using image data, and another LSTM network may be used to capture motion pattern using wireless CSI data. A similarity measure is applied to determine similarity between two motion signatures. LTSM may be a variant of RNN (Recurrent Neural Network). Other RNN networks can also be used for this purpose, e.g., GRU (Gated Recurrent Unit). Additionally, instead of using LSTM, attention based networks can also be used to capture motion signature from each sensing modality. To estimate similarity between two motion signatures, the system may use cosine similarity, or normalized weighted distance, or Euclidean distance, or cluster analysis, or other similarity measures, or a combination of these.

In such an embodiment, both input features may be fused to refine and update input features at step 505. The input features of the camera data (e.g., motion trajectory, orientation information) are fed to an LSTM network N1 and the input features of the wireless packet data are fed to an LSTM network N2 at step 507 and 509. Step 507 represents the input features being fed from the image data and at step 509 the input features are being fed from the wireless data. At step 511, N1 network generates a latent representation of motion trajectory $MT_i^{cam}$ of person i. At step 513, N2 network generates a latent representation of motion trajectory $MT_j^{Wi-Fi}$ of person j. At step 515 a cosine similarity S is estimated between $MT_i^{cam}$ and $MT_j^{Wi-Fi}$. At decision 517, the system determines if the cosine similarity S is less than a predefined threshold T. At step 519, if S is less than a threshold T2, then it reports a 'Yes' indicating person i and person j are the same person. Otherwise, at step 521 the system determines that S is greater than threshold T2 and will return a 'No' indicating that person i and person j are not the same person. Thus, the system 500 may restart the process to very another subset of persons identified by the image data and the wireless transceiver.

In another embodiment, instead of three antennas, a different number of antennas are used, e.g., one, two, four, and others. In another embodiment, instead of providing all the CSI values of all the subcarriers to the LSTM model, a PCA (Principal Component Analysis) is applied and first few major components are used, thus discarding CSI values from the noisy subcarriers. In another embodiment, RSSI is used in addition to CSI, or independently. In yet another embodiment, instead of people, robots or other objects that carry wireless chipsets and they are detected, tracked, and identified using the aforementioned approach. In another embodiment, instead of a smartphone, a fob or a device may be carried that contains a wireless chipset. In another embodiment, instead of using a single system unit, a number of system units are deployed throughout an area to capture mobility patterns throughout the space.

FIG. 6 is an exemplary visualization of a motion signature using camera and a motion signature using a wireless signal (e.g. Wi-Fi signal). $MS_i^{cam}$ 605 be the Motion Signature of person i 601 using camera. The camera motion signature 605 may be a matrix providing the motion trajectory of the person within a time window of TW1. An example of $MS_i^{Wi-Fi}$ 603 is shown as well as a Motion Signature of person i utilizing a wireless transceiver (such as a Wi-Fi transceiver). Assuming person i is carrying a smartphone or other mobile deice that may generate wireless (e.g. Wi-Fi) traffic, the packets are received in our system unit. CSI values may be extracted from the received packets. The system unit may also measure the Angle of Arrival (AoA) of the packet using SpotFi algorithm (or any other type of algorithm) by leveraging CSI values from multiple antennas. Using the AoA and/or raw CSI values, the system may estimate motion trajectory of person i as shown using $MS_i^{Wi-Fi}$ 603 in FIG. 6.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An apparatus, comprising:
a wireless transceiver configured to communicate packet data with a mobile device associated with one or more persons in a vicinity of the wireless transceiver;
a camera configured to capture image data of one or more persons in the vicinity; and
a controller in communication with the wireless transceiver and the camera, the controller configured to:
receive a plurality of packet data from the mobile device, wherein the packet data includes at least amplitude information associated with a wireless channel communicating with the wireless transceiver;
determine a camera motion representing motion of the one or more persons utilizing the image data and a packet motion representing motion of the one or more persons utilizing the packet data;
identify each of the one or more persons in response to the camera motion and the packet motion; and
output information associated with each of the one or more persons in response to the identification of the one or more persons.

2. The apparatus of claim 1, wherein the controller is further configured to identify the one or more persons in response to a comparison of the camera motion and the packet motion.

3. The apparatus of claim 1, wherein the wireless transceiver includes three or more antennas.

4. The apparatus of claim 1, wherein the controller is configured to communicate with one or more applications stored on the mobile device.

5. The apparatus of claim 1, wherein the wireless transceiver is configured to receive a media access control (MAC) address associated with the mobile device and the controller is configured to hash the MAC address.

6. The apparatus of claim 1, wherein the wireless transceiver is configured to receive inertial movement data from the mobile device.

7. The apparatus of claim 1, wherein the controller is further configured to estimate an angle of arrival of the one or more persons in response to the plurality of packet data.

8. The apparatus of claim 1, wherein the controller is configured to determine the packet motion utilizing at least a long short term memory model.

9. The apparatus of claim 1, wherein the wireless transceiver is a Wi-Fi transceiver or a Bluetooth transceiver.

10. The apparatus of claim 1, wherein the controller is further configured to determine the packet motion utilizing at least an estimated angle of arrival.

11. The apparatus of claim 1, wherein the controller is further configured to determine the packet motion utilizing at least inertial movement data from the mobile device.

12. A system, comprising:
a wireless transceiver configured to communicate packet data with a mobile device associated with one or more persons in a vicinity of the wireless transceiver;
a camera configured to identify the one or more persons and identify an estimated camera motion utilizing at least image data; and
a controller in communication with the wireless transceiver and the camera, the controller configured to:
receive a plurality of packet data from the mobile device, wherein the packet data includes at least amplitude information associated with the wireless channel communicating with the wireless transceiver;
estimate a packet motion of each of the one or more persons in response to the plurality of packet data; and
identify each of the one or more persons in response to the estimated camera motion and estimated packet motion.

13. The system of claim 12, wherein the controller is configured to output a graphical image including boundary boxes around an image of each of the one more persons in response to the identification of each of the one or more persons.

14. The system of claim 12, wherein the controller is further configured to determine the estimated packet motion utilizing at least an estimated angle of arrival.

15. The system of claim 12, wherein the camera is configured to identify the estimated camera motion utilizing at least an estimated location and estimated tracking of image data of the one or more persons.

16. The system of claim 12, wherein the wireless transceiver is a Wi-Fi transceiver or a Bluetooth transceiver.

17. The system of claim 12, wherein the controller is configured to determine the estimated packet motion in response to channel state information of the packet data.

18. A method of identifying a person utilizing a camera and a wireless transceiver, comprising:
receiving packet data from a mobile device associated with a first set of data representative of one or more persons in a vicinity of the wireless transceiver;
obtaining image data associated with a second set of data representative of one or more persons associated with the camera;
determining an estimated motion of the one or more persons from the first set of data utilizing the packet data from the mobile device;
determining an estimated camera motion of the one or more person from the second set of data utilizing the image data;
comparing the estimated motion to the estimated camera motion; and
identifying the one or more persons in response to the comparison.

19. The method of claim 18, wherein the packet data includes channel state information.

20. The method of claim 18, wherein the packet data includes wireless channel state information data.

* * * * *